(12) United States Patent
Fleischhacker et al.

(10) Patent No.: US 11,872,953 B2
(45) Date of Patent: Jan. 16, 2024

(54) MOTOR VEHICLE

(71) Applicant: Dr. Ing. h.c. F. Porsche Aktiengesellschaft, Stuttgart (DE)

(72) Inventors: Robert Fleischhacker, Tiefenbronn-Muehlhausen (DE); Martin Kamm, Niefern-Oeschelbronn (DE); Mathias Froeschle, Ostfildern (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 17/979,031

(22) Filed: Nov. 2, 2022

(65) Prior Publication Data
US 2023/0166685 A1 Jun. 1, 2023

(30) Foreign Application Priority Data

Nov. 26, 2021 (DE) ...................... 10 2021 131 117.9
Sep. 2, 2022 (DE) ...................... 10 2022 122 245.4

(51) Int. Cl.
*B60R 22/20* (2006.01)
*B60R 22/24* (2006.01)

(52) U.S. Cl.
CPC ............ *B60R 22/201* (2013.01); *B60R 22/24* (2013.01)

(58) Field of Classification Search
CPC ... B60R 22/201; B60R 22/206; B60R 22/208; B60R 22/24
See application file for complete search history.

(56) References Cited

U.S. PATENT DOCUMENTS

| 4,258,933 A | * | 3/1981 | Takada ................. B60R 22/04 280/808 |
| 4,317,584 A | * | 3/1982 | Takata ................. B60R 22/06 297/469 |
| 4,420,173 A | * | 12/1983 | Moriya ................ B60R 22/06 280/804 |

(Continued)

FOREIGN PATENT DOCUMENTS

| DE | 3719656 A1 | * | 12/1987 | ........... B60R 22/201 |
| DE | 10202623 A1 | * | 8/2003 | ............ B60R 22/20 |

(Continued)

OTHER PUBLICATIONS

German Search Report dated Oct. 19, 2023.

*Primary Examiner* — Barry Gooden, Jr.
(74) *Attorney, Agent, or Firm* — Gerald E. Hespos; Michael J. Porco

(57) ABSTRACT

A motor vehicle (1) has a seat (7), a seatbelt (8), a deflector (5), longitudinal and vertical guide rails (2, 4), and first and second guide elements (3, 9). The seatbelt (8) is configured to secure a person seated in the seat (7) and is deflected by the deflector (5). The first guide element (3) is guided displaceably in a longitudinal direction (L) of the motor vehicle (1) in the longitudinal guide rail (2). The vertical guide rail (4) is fastened to the first guide element (3) and is displaced upon displacement of the first guide element (3). The second guide element (9) is guided displaceably in a vertical direction of the motor vehicle (1) in the vertical guide rail (4). The deflector (5) is fastened to the second guide element (9) so that the deflector (5) also is displaced upon displacement of the second guide element (9).

12 Claims, 4 Drawing Sheets

(56) References Cited

U.S. PATENT DOCUMENTS

| | | | | |
|---|---|---|---|---|
| 4,765,651 | A * | 8/1988 | Unger | B60R 22/023 |
| | | | | 74/89.14 |
| 4,850,610 | A * | 7/1989 | Asagiri | B60R 22/06 |
| | | | | 280/804 |
| 5,141,249 | A * | 8/1992 | Saitoh | B60R 22/06 |
| | | | | 297/469 |
| 5,203,588 | A * | 4/1993 | Watanabe | B60R 22/206 |
| | | | | 280/804 |
| 5,709,408 | A * | 1/1998 | Carraway, Jr. | B60R 22/206 |
| | | | | 180/286 |
| 6,234,529 | B1 * | 5/2001 | Ellison | B60R 22/24 |
| | | | | 296/210 |
| 9,283,926 | B2 | 3/2016 | Thomas et al. | |
| 2011/0057432 | A1 | 3/2011 | You et al. | |
| 2014/0265503 | A1 | 9/2014 | Thomas et al. | |
| 2019/0168707 | A1 * | 6/2019 | Jaradi | B60R 22/20 |
| 2020/0148161 | A1 * | 5/2020 | Jaradi | B60R 22/48 |

FOREIGN PATENT DOCUMENTS

| | | | | |
|---|---|---|---|---|
| DE | 102009031638 A1 * | 1/2011 | | B60R 22/023 |
| DE | 102010035732 A1 * | 3/2012 | | B60R 22/022 |
| JP | 2009154745 A * | 7/2009 | | |
| JP | 2021116041 | 8/2021 | | |
| KR | 20110016512 A * | 2/2011 | | B60R 22/26 |
| KR | 20160102765 A * | 8/2016 | | B60R 22/24 |

* cited by examiner

MOTOR VEHICLE

CROSS-REFERENCE TO RELATED APPLICATION

This application claims priority on German Patent Application No 10 2021 131 117.9 filed Nov. 26, 2021 and German Patent Application No 10 2022 122 245.4 filed Feb. 9, 2022, the entire disclosures of which are incorporated herein by reference.

BACKGROUND

Field of the Invention

The invention relates to a motor vehicle.

Related Art

Prior art motor vehicles have seatbelts that secure a person seated on a seat of the motor vehicle in the event of an accident and prevent the person from being ejected out of the seat. The seatbelt is fastened to a body of the motor vehicle at a fastening point below the seat surface. The seatbelt is deflected from the fastening point via a deflection means arranged above the seat surface. Thus, a properly used seatbelt extends from the deflection means over the person to a belt buckle and from the belt buckle to the fastening point.

US 2014/0265503 discloses a seatbelt where the position of the deflection means is changeable in the longitudinal direction and in the vertical direction of the motor vehicle. Thus, the position of the deflection means can be adjusted to a position of the seat in the longitudinal direction and to a size of the person to be secured.

By contrast, the present invention addresses the problem of creating an improved possibility for adjusting the deflection means in the longitudinal and in the vertical direction of the motor vehicle.

SUMMARY

The invention relates to a motor vehicle that comprises a seat, a seatbelt, a deflection means, a longitudinal guide rail, a first guide element, a vertical guide rail, and a second guide element. The seatbelt is configured to secure a person seated in the seat. The seatbelt is deflected on or in the deflection means. The first guide element is guided displaceably in the longitudinal guide rail in a longitudinal direction of the motor vehicle. In the context of this specification, the longitudinal direction is understood to mean the direction in which the vehicle is intended to be moved during operation without a steering angle.

The vertical guide rail is fastened to the first guide element such that, in the event of a displacement of the first guide element, the vertical guide rail also is displaced. It is possible for the end of the vertical guide rail connected to the first guide element to perform the same translational movement as the first guide element when the first guide element is displaced in the longitudinal guide rail. It also is possible that the vertical guide rail additionally performs a superposed rotary movement.

The second guide element is guided displaceably in the vertical guide rail in a vertical direction of the motor vehicle. In the context of this specification, the vertical direction is understood to mean the direction that runs vertically upon intended use of the motor vehicle. The second guide element also can be guided in the vertical guide rail in a further direction, for example in the longitudinal direction. The movement of the second guide element when it is guided in the vertical guide rail can thus be a translational movement in the vertical and longitudinal directions.

The deflection means is fastened to the second guide element such that, in the event of a displacement of the second guide element, the deflection means also is displaced. This can mean that the deflection means is configured to perform the same movement as the second guide element.

With the mechanism described above, the deflection means can be moved in its longitudinal and vertical direction in a particularly convenient manner. The construction is relatively simple and yet stable.

According to some embodiments, the vertical guide rail can be pivotable relative to the longitudinal guide rail. As a result, the orientation of the vertical guide rail can be adjusted to the position of the seat and to the person seated in the seat. It is possible that the vertical guide rail can be pivoted along with the first guide element. The pivoting movement of the vertical guide rail can be coupled to the pivotal movement of the first guide element. Alternatively, the vertical guide rail can be pivoted relative to both the longitudinal guide rail and the first guide element.

According to some embodiments, the vertical guide rail can be connected hingedly to a body of the motor vehicle at a fixed point. The vertical guide rail can thus be arranged in a sufficiently stable manner in the motor vehicle. This can mean that this fixed point is not displaceable relative to the body. The hinged connection can mean that the vertical guide rail is pivotable about a geometric axis passing through the fixed point relative to the body. The vertical guide rail can be connected to the fixed point directly or via other components.

According to some embodiments, the fixed point can be arranged below the vertical guide rail and the longitudinal guide rail. In this context, the term "below" is understood to describe the positioning relative to one another upon intended use of the motor vehicle.

The seatbelt may be guided from a fastening point to the deflection means and from the deflection means back to the fastening point.

According to some embodiments, the seatbelt can comprise a buckle tongue, and the motor vehicle can comprise a belt buckle. The buckle tongue can be inserted into the belt buckle and locked in the inserted state. In the inserted state of the buckle tongue, the seatbelt can be guided from the deflection means over the buckle tongue and back to the fastening point. Thus, a person can be secured particularly well, in that the seatbelt extends from the deflection means to the buckle tongue over the chest area of the person and from the buckle tongue to the fastening point in the abdomen or hip area.

In some embodiments, the motor vehicle can comprise a drive that is configured to displace the first guide element in the longitudinal guide rail. This is a very comfortable method for a user to displace the first guide element.

The drive can be configured as a spindle drive.

According to some embodiments, the motor vehicle can comprise a roof spar. The longitudinal guide rail can be arranged in or on the roof spar. At this position, the longitudinal guide rail does not bother, or only slightly bothers, the person seated in the motor vehicle. In addition, it has been found that the position of the deflection means can be adjusted particularly well to the position of the seat.

In some embodiments, the motor vehicle can comprise a winding means on which the seatbelt is at least partially windable. The seatbelt can be wound up to more than 90% of its length on the winding means. The winding means is arranged behind the longitudinal guide rail in the longitudinal direction. Preferably, the winding means is arranged in the area of a C-pillar of the motor vehicle. The winding means can be arranged on the roof spar, for example.

The position of the winding means is particularly advantageous for a low force effect on the longitudinal guide rail and/or the roof spar.

Further features and advantages of the invention become apparent from the following description of exemplary embodiments, with reference to the appended illustrations. The same reference numerals are used for the same or similar features and for features having the same or similar functions.

DETAILED DESCRIPTION

Figure 1:
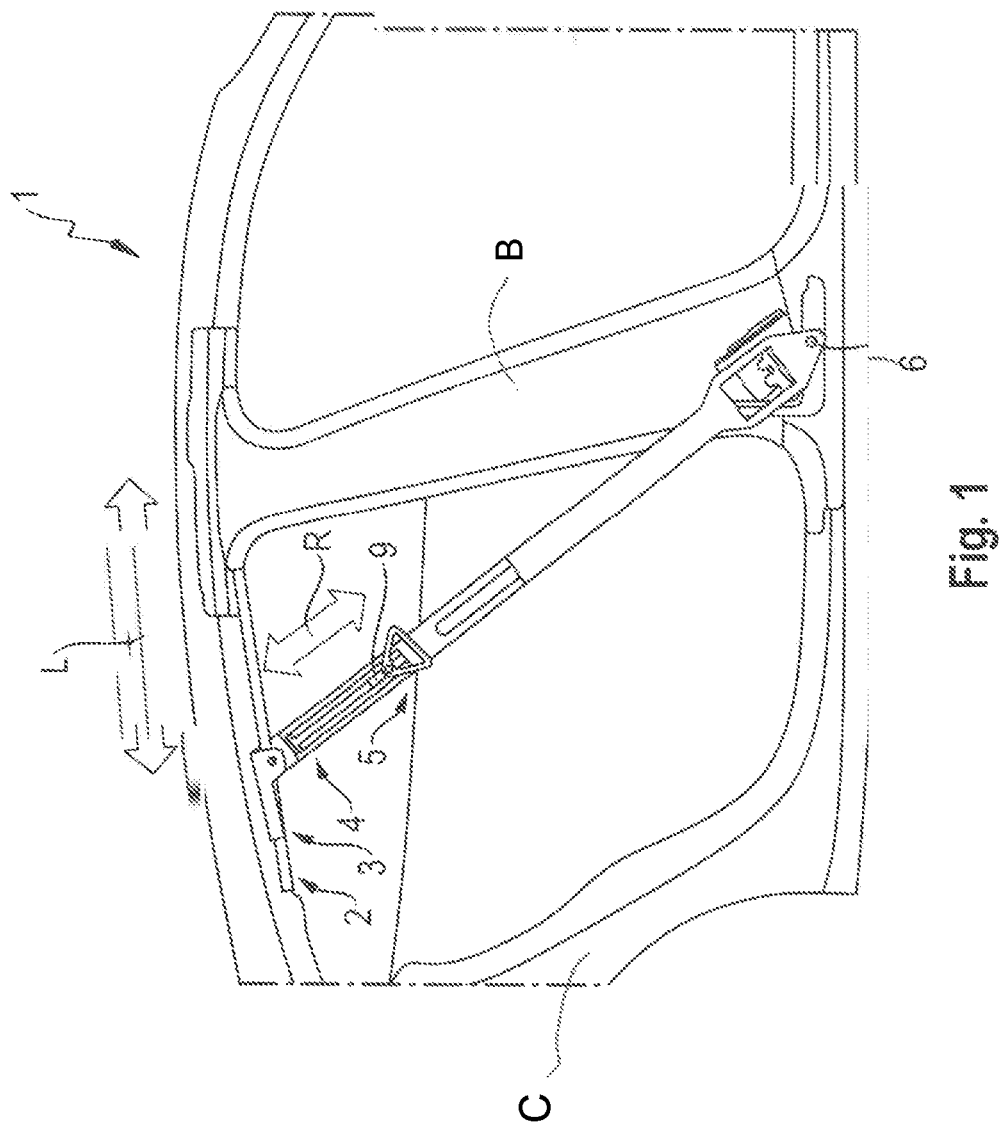
FIG. 1 a schematic sectional view of a part of a motor vehicle according to an embodiment of the invention.

The motor vehicle 1 comprises a C-pillar C, a B-pillar B, a longitudinal guide rail 2, a first guide element 3, a vertical guide rail 4, a deflection means 5, a second guide element 9, and a fixed point 6 via which the vertical guide rail 4 is connected hingedly to the body of the motor vehicle 1.

The first guide element 3 is guided in the longitudinal guide rail 2 and is displaceable in the longitudinal direction L of the motor vehicle 1. The vertical guide rail 4 is fastened hingedly to the first guide element 3. Upon a displacement of the first guide element 3 in the longitudinal direction L, the end of the vertical guide rail 4 connected to the first guide element 3 also is moved translationally. Due to the fastening to the fixed point 6, a pivoting movement takes place about a geometric axis extending through the fixed point 6.

The second guide element 9 is guided in the vertical guide rail 4 and is displaceable in the direction R. The direction R changes as a function of the position of the first guide element 3 in the longitudinal guide rail 2 due to the pivotability of the vertical guide rail 4 about the geometric axis. However, the direction R always includes a component in the vertical direction of the motor vehicle.

The deflection means 5 is fastened to the second guide element 9 and is moved in a similar manner as the second guide element 9 when the second guide element 9 is moved. Thus, a user can adjust the position of the deflection means 5 by a displacement of the first guide element 3 and the second guide element 9. The position in the longitudinal direction L is adjusted by a displacement of the first guide element 3 in the longitudinal direction L, while a position of the deflection means 5 in the vertical direction can also be adjusted by a displacement of the second guide element 9 in the direction R.

Figure 2:
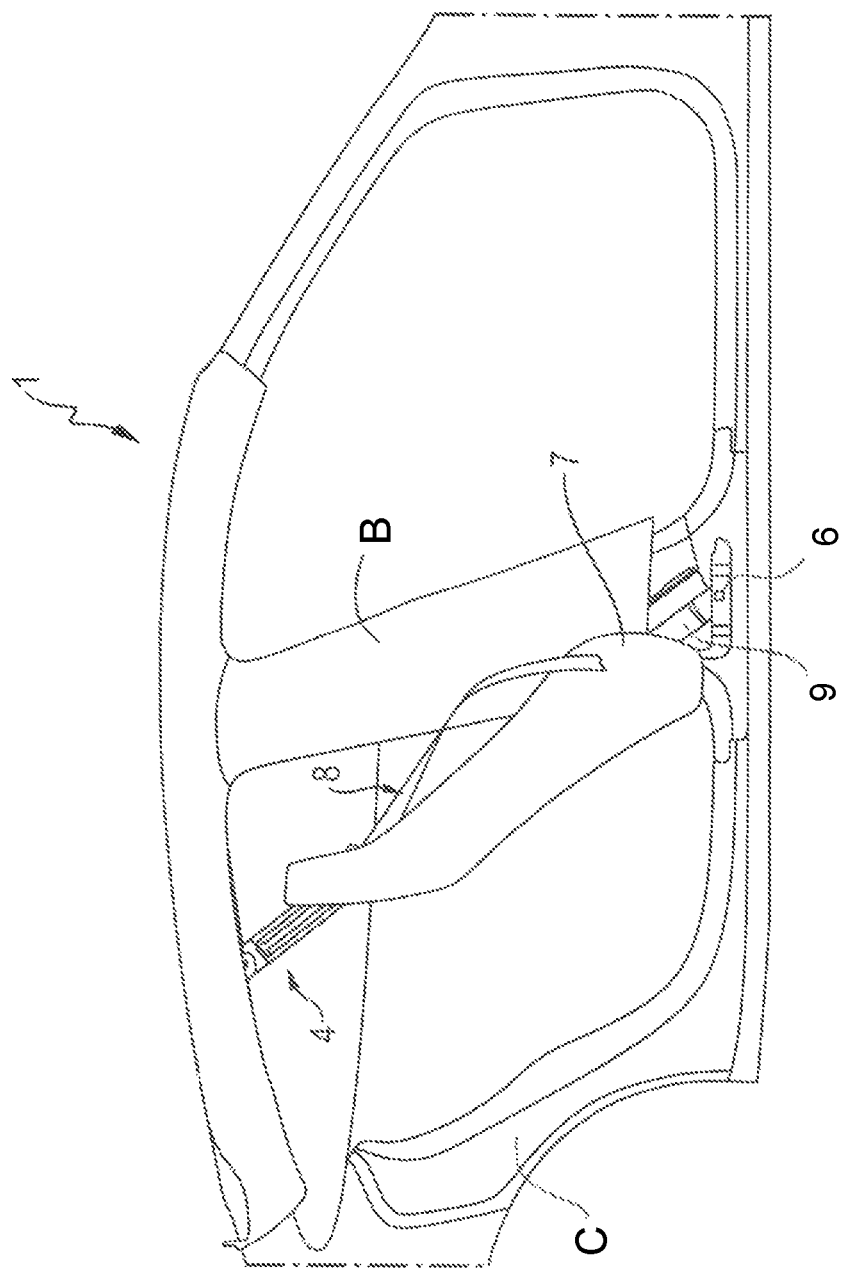
FIG. 2 a schematic sectional view of the motor vehicle OF FIG. 1 with the seat shown.

FIG. 2 shows a seatbelt 8 extending over a seat 7 so that it can secure a person. The course of the seatbelt 8, in particular in the chest area of the person, is substantially determined by the position of the deflection means 5, through which the seatbelt 8 extends.

Figure 3:
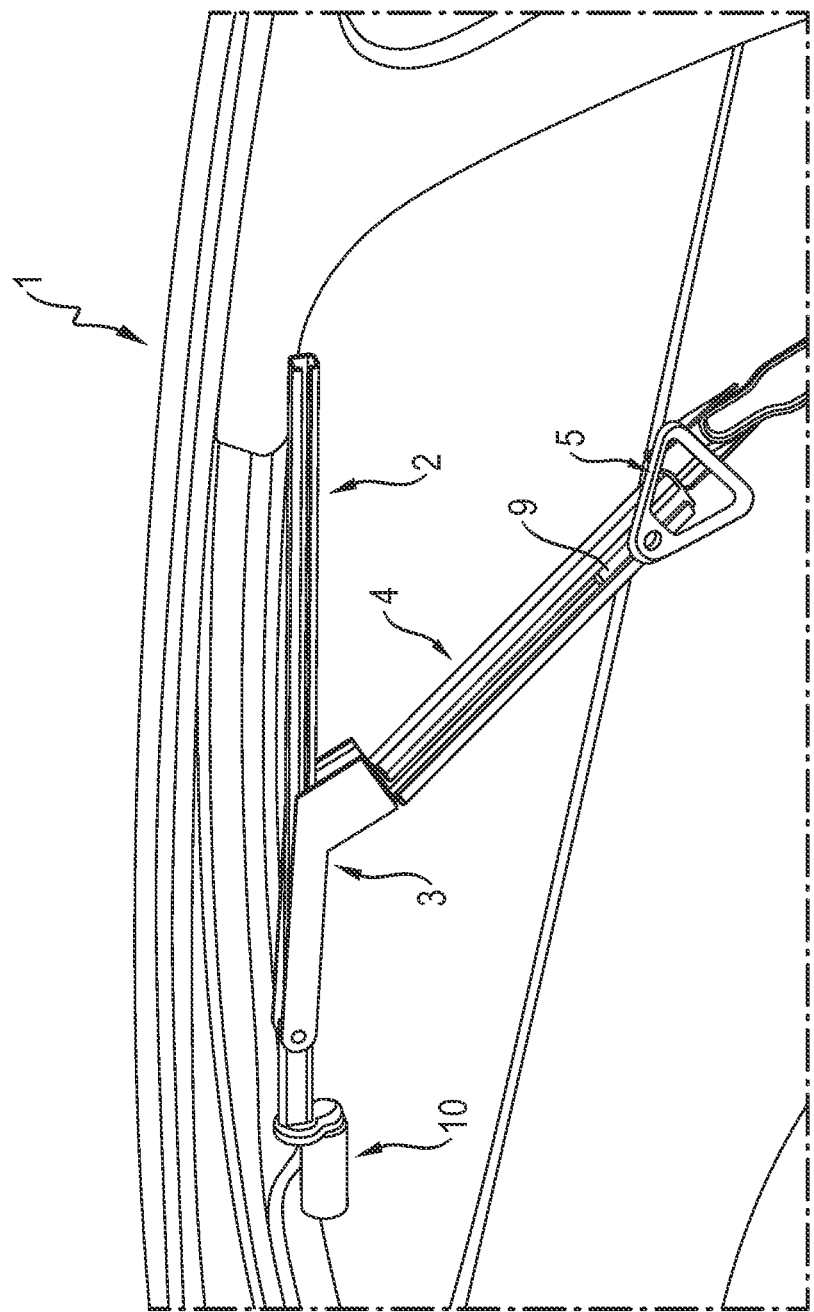
FIG. 3 a schematic sectional view of a part of a motor vehicle according to an embodiment of the invention with a drive for adjusting the position of the first guide element.

In the embodiment shown in FIG. 3, a drive 10 is provided, which can be configured as a spindle drive and is configured to displace the first guide element 3 in the longitudinal direction L. Thus, the position of the deflection means 5 in the longitudinal direction L can be adjusted by a user in a particularly comfortable manner.

Figure 4:
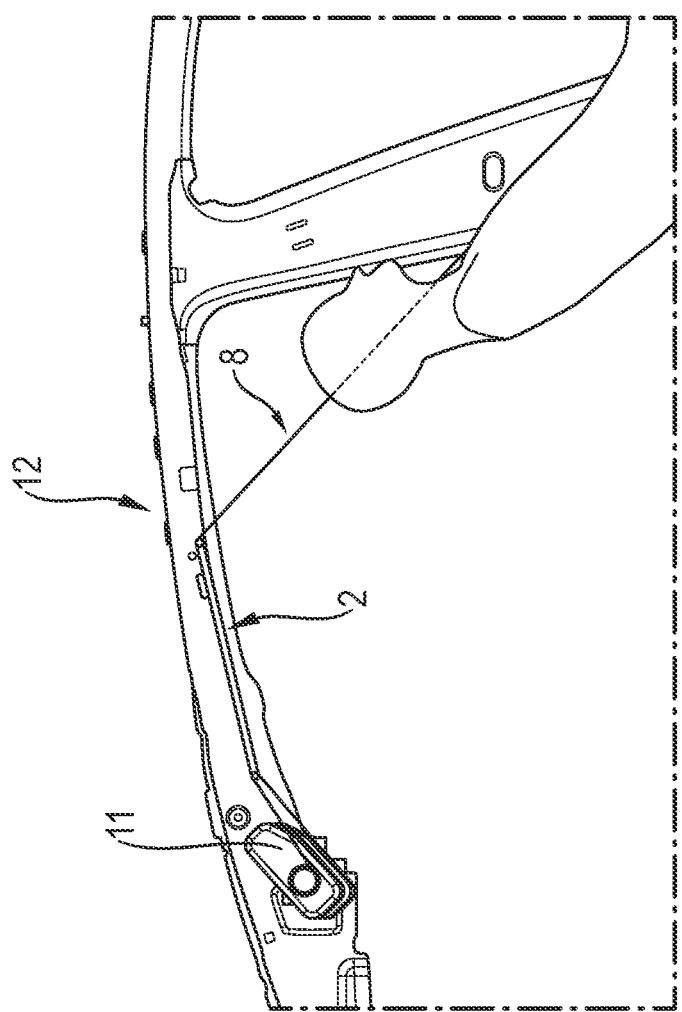
FIG. 4 a schematic sectional view of a part of a motor vehicle according to an embodiment of the invention with a winding means, on which a majority of the seatbelt can be rolled.

In the embodiment shown in FIG. 4, a winding means 11 is provided, on which a majority of the seatbelt 8 can be wound. This is advantageous for stowing the seatbelt 8 in a space-saving manner when not in use. The winding means 11 is arranged in the longitudinal direction L behind the longitudinal guide rail 2 on the roof spar 12 of the motor vehicle 1. For example, the winding means 11 can be arranged approximately in the area of the C-pillar of the motor vehicle 1.

The position of the winding means 11 is particularly advantageous for the forces acting on the longitudinal guide rail 2 and/or the roof spar 12.

The invention claimed is:

1. A motor vehicle (1) comprising a seat (7), a seatbelt (8), a deflection means (5), a longitudinal guide rail (2), a first guide element (3), a vertical guide rail (4), and a second guide element (9), the seatbelt (8) being formed separately from the vertical guide rail (4) and being configured to secure a person seated in the seat (7), the seatbelt (8) being deflected on or in the deflection means (5), the first guide element (3) being guided displaceably in a longitudinal direction (L) of the motor vehicle (1) in the longitudinal guide rail (2), the vertical guide rail (4) having an upper end fastened pivotally to the first guide element (3) such that the vertical guide rail (4) also is displaced and pivoted upon displacement of the first guide element (3) along the longitudinal guide rail (2) in the longitudinal direction (L) of the motor vehicle (1), the vertical guide rail (4) further having a lower end directly connected pivotally to a body of the motor vehicle (1) at a fixed point (6) arranged below the longitudinal guide rail (2) so that the vertical guide rail (4) is pivotable about a geometric axis extending through the fixed point (6) as the first guide element (3) is displaced along the longitudinal guide rail (2) in the longitudinal direction (L) of the motor vehicle (1), the second guide element (9) being guided displaceably in an extending direction of the vertical guide rail (4), and the deflection means (5) being fastened to the second guide element (9) such that the deflection means (5) also is displaced upon displacement of the second guide element (9).

2. The motor vehicle (1) of claim 1, wherein the seatbelt (8) is guided from a fastening point to the deflection means (5) and from the deflection means (5) back to the fastening point.

3. The motor vehicle (1) of claim 2, wherein the seatbelt (8) comprises a buckle tongue, and the motor vehicle (1) comprises a belt buckle, the buckle tongue being insertable into the belt buckle and is lockable in an inserted state, the seatbelt (8) being guided in the inserted state of the buckle tongue from the deflection means (5) back to the fastening point over the buckle tongue.

4. The motor vehicle (1) of claim 1, wherein the motor vehicle (1) comprises a drive (10) that is configured to displace the first guide element (3) in the longitudinal guide rail (2).

5. The motor vehicle (1) of claim 4, wherein the drive (10) is a spindle drive.

6. The motor vehicle (1) of claim 1, wherein the motor vehicle (1) comprises a roof spar, and the longitudinal guide rail (2) is arranged in or on the roof spar.

7. The motor vehicle (1) of claim 1, further comprising a winding means on which the seatbelt (8) can be at least partially wound, all of the winding means being arranged behind the longitudinal guide rail (2) in the longitudinal direction (L).

8. The motor vehicle of claim 1, further comprising a C-pillar (C) and a B-pillar forward of the C-pillar (C) in the longitudinal direction of the motor vehicle, at least a portion of the longitudinal guide rail (2) being between the C-pillar (C) and the B-pillar (B) in proximity of a roof of the vehicle.

9. The motor vehicle of claim 8, wherein the roof of the vehicle has a roof spar (12), and the longitudinal guide rail (2) is arranged in or on the roof spar.

10. A motor vehicle (1) comprising:
a C-pillar (C);
a B-pillar (B) forward of the C-pillar (C) in a longitudinal direction of the motor vehicle (1);
a longitudinal guide rail (2) extending in the longitudinal direction (L) of the motor vehicle (1) in proximity to upper ends of the C-pillar (C) and the B-pillar (B);
a first guide element (3) guided displaceably in the longitudinal direction (L) of the motor vehicle (1) along the longitudinal guide rail (2);
a vertical guide rail (4) having an upper end pivotally connected to the first guide element (3) and movable in the longitudinal direction (L) of the motor vehicle (1) as the first guide element (3) is displaced along the longitudinal guide rail (2), the vertical guide rail (4) further having a lower end directly connected pivotally to a fixed point (6) on the motor vehicle (1) for pivoting movement about a geometric axis extending through the fixed point (6) as the upper end of the vertical guide rail (4) and the first guide element (3) move in the longitudinal direction of the motor vehicle (1);
a second guide element (9) slidably engaged in the vertical guide rail (4) for movement along the vertical guide rail (4) as the vertical guide rail (4) pivots relative to the first guide element (3) and the fixed point (6);
a deflection means (5) pivotally connected to the upper end of the second guide element (9); and
a seatbelt (8) formed as a separate component from the vertical guide rail (4), the seatbelt (8) having a first end connected to a first fastening point on the motor vehicle (1), a second end removably connected to a second fastening point on the motor vehicle and an intermediate portion slidably engaged in the deflection means (5).

11. The motor vehicle of claim 10, further comprising a seat (7) in the motor vehicle (1) at a position forward of the C-pillar (C) in the longitudinal direction (L) of the motor vehicle (1), at least part of the seat (7) being above the fixed point (6) on the motor vehicle to which the lower end of the second guide element (9) is pivotally connected.

12. The motor vehicle (1) of claim 11, wherein the second end of the seatbelt (8) comprises a buckle tongue, and the second fastening point on the motor vehicle (1) comprises a belt buckle, the buckle tongue being insertable into the belt buckle and being lockable in an inserted state.

* * * * *